US012342757B2

(12) United States Patent
Roberge et al.

(10) Patent No.: US 12,342,757 B2
(45) Date of Patent: Jul. 1, 2025

(54) FLOW SPLITTER FOR REMOVING WASTE FROM AN AGRICULTURAL HARVESTER AND AGRICULTURAL HARVESTER

(71) Applicant: CNH Industrial America LLC, New Holland, PA (US)

(72) Inventors: Ryan Christopher Roberge, Saskatoon (CA); Rogelio Chovet, De Pinte (BE); Carlos Eduardo de Carvalho Visconti, São Paulo (BR)

(73) Assignee: CNH Industrial America LLC, New Holland, PA (US)

( * ) Notice: Subject to any disclaimer, the term of this patent is extended or adjusted under 35 U.S.C. 154(b) by 777 days.

(21) Appl. No.: 17/615,332

(22) PCT Filed: May 29, 2020

(86) PCT No.: PCT/BR2020/050188
§ 371 (c)(1),
(2) Date: Nov. 30, 2021

(87) PCT Pub. No.: WO2020/237339
PCT Pub. Date: Dec. 3, 2020

(65) Prior Publication Data
US 2022/0217906 A1    Jul. 14, 2022

(30) Foreign Application Priority Data
May 30, 2019  (BR) ......................... 102019011117-8

(51) Int. Cl.
*A01D 43/08*     (2006.01)
*A01D 45/10*     (2006.01)

(52) U.S. Cl.
CPC ............. *A01D 43/08* (2013.01); *A01D 45/10* (2013.01)

(58) Field of Classification Search
CPC ..... A01D 45/10; A01D 43/08; A01D 41/1243
See application file for complete search history.

(56) References Cited

U.S. PATENT DOCUMENTS 3,794,047 A  *  2/1974  De Coene ................. A01F 7/06
                                                              460/73
4,039,434 A  *  8/1977  Croucher .................. B07B 9/02
                                                              209/285

(Continued)

FOREIGN PATENT DOCUMENTS

BR      102014029504 A2    6/2016
CN          1154788 A      7/1997

(Continued)

OTHER PUBLICATIONS

International Search Report and Written Opinion for PCT Application No. PCT/BR2020/050188 dated Sep. 9, 2020 (12 pages).

(Continued)

*Primary Examiner* — Alicia Torres
*Assistant Examiner* — Julia C Tran
(74) *Attorney, Agent, or Firm* — Peter K. Zacharias

(57) ABSTRACT

A system for removing debris from an agricultural harvester includes a flow splitter supported relative to an outlet of a chopper assembly of the harvester such that the flow splitter at least partially extends within a stream of processed crop material discharged from the chopper assembly. The flow splitter is configured to divide the stream of processed crop material into separate crop material flows for receipt within an extraction chamber of the agricultural harvester.

17 Claims, 13 Drawing Sheets

(56) References Cited

U.S. PATENT DOCUMENTS

| | | | |
|---|---|---|---|
| 4,270,337 A | 6/1981 | Pinto | |
| 4,295,325 A * | 10/1981 | Cannavan | A01D 45/10 56/61 |
| 4,550,552 A * | 11/1985 | Stiff | A01D 45/10 56/505 |
| 4,555,896 A | 12/1985 | Stiff et al. | |
| 4,646,512 A * | 3/1987 | Scott | A01D 45/10 56/16.6 |
| 5,069,024 A | 12/1991 | Riberio Pinto | |
| 5,092,110 A | 3/1992 | Dommert et al. | |
| 5,488,820 A * | 2/1996 | Cannavan | A01D 45/10 56/504 |
| 6,076,340 A | 6/2000 | Fowler | |
| 6,500,062 B1 | 12/2002 | Harris et al. | |
| 6,928,800 B2 | 8/2005 | Huff, Jr. | |
| 2004/0053652 A1 * | 3/2004 | Duquesne | A01D 41/1243 460/112 |
| 2004/0060271 A1 | 4/2004 | Ameye | |
| 2004/0224735 A1 | 11/2004 | Hinds | |
| 2011/0130181 A1 * | 6/2011 | Roberge | A01D 41/1243 460/111 |
| 2013/0324199 A1 | 12/2013 | Roberge et al. | |
| 2015/0327438 A1 | 11/2015 | Cazenave et al. | |
| 2016/0316625 A1 * | 11/2016 | Holly | A01D 45/003 |
| 2017/0325402 A1 | 11/2017 | Craig | |
| 2020/0245558 A1 * | 8/2020 | Oubre, Jr. | A01D 43/08 |

FOREIGN PATENT DOCUMENTS

| | | |
|---|---|---|
| CN | 202551694 U | 11/2012 |
| CN | 203015480 U | 6/2013 |
| CN | 203912610 U | 11/2014 |
| CN | 104255190 A | 1/2015 |
| CN | 106489423 A | 3/2017 |
| CN | 106576590 A | 4/2017 |
| CN | 108617239 A | 10/2018 |
| JP | 2015202085 A | 11/2015 |
| WO | 2018/106653 A1 | 6/2018 |

OTHER PUBLICATIONS

Chinese Office Action with English Translation dated Nov. 23, 2022 (16 pages).

Indian Examination with English Translation Apr. 28, 2022 (7 pages).

* cited by examiner

FLOW SPLITTER FOR REMOVING WASTE FROM AN AGRICULTURAL HARVESTER AND AGRICULTURAL HARVESTER

FIELD OF THE INVENTION

The present subject matter relates generally to systems for improved debris removable for agricultural harvesters, such as sugar cane harvesters, and, more particularly, to a flow splitting device or flow splitter for splitting the stream of processed crop material expelled from a chopper assembly as it flows into the primary extractor of an agricultural harvester.

BACKGROUND OF THE INVENTION

Typically, agricultural harvesters include one or more extractors within which air is drawn through a stream of harvested crops, such as a stream of sugar cane billets, to separate and remove pieces of debris or trash from the crops. For example, a primary extractor may be positioned near an intake of an elevator that conveys crops toward a receiver collecting the crops, while a secondary extractor may be positioned near a discharge of the elevator. The primary extractor is typically located immediately downstream of the harvester's chopper assembly such that the stream of processed crop material expelled from the chopper assembly flows into a debris extraction chamber defined by the extractor housing. An extractor fan located above the stream of processed crop material within the housing is configured to draw air through the stream to suck debris or trash upwardly and out of the top of the extractor, thereby allowing the heavier crop (e.g., sugar can billets) to fall downwardly to the intake of the elevator for delivery to the associated receiver.

Currently, efforts are being made to increase the throughput of agricultural harvesters. However, as the throughput is increased, the effectiveness of the primary extractor to remove debris or other trash from the stream of harvested crop material flowing into the extractor housing generally decreases. Specifically, the increase in volume typically results in reduced airflow through the extractor, thereby reducing the suction force within the extractor housing and, thus, the cleaning efficiency of the extractor.

Accordingly, a system and method for removing debris from an agricultural harvester that allows for improved airflow through the harvester's extractor would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for removing debris from an agricultural harvester. The system includes a chopper assembly configured to receive and process crop material. The chopper assembly includes an outlet through which a stream of processed crop material is discharged from the chopper assembly. The system also includes a flow splitter supported relative to the outlet of the chopper assembly such that the flow splitter at least partially extends within the stream of processed crop material discharged from the chopper assembly. The flow splitter is configured to divide the stream of processed crop material into separate crop material flows for receipt within an extraction chamber of the agricultural harvester.

In another aspect, the present subject matter is directed to an agricultural harvester. The harvester includes a chopper assembly configured to receive and process crop material, with the chopper assembly including an outlet through which a stream of processed crop material is discharged from the chopper assembly. The harvester also includes an extractor positioned downstream of the chopper assembly, with the extractor including a housing defining an extraction chamber. The extraction chamber is configured to receive the stream of processed crop material discharged from the chopper assembly. In addition, the harvester includes a flow splitter at least partially extending within the stream of processed crop material flowing between the chopper assembly and the extraction chamber. The flow splitter is configured to divide the stream of processed crop material into separate crop material flows.

In still another aspect, the present subject matter is directed to a flow splitter for use within an agricultural harvester. The flow splitter may be configured in accordance with one or more of the embodiments described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
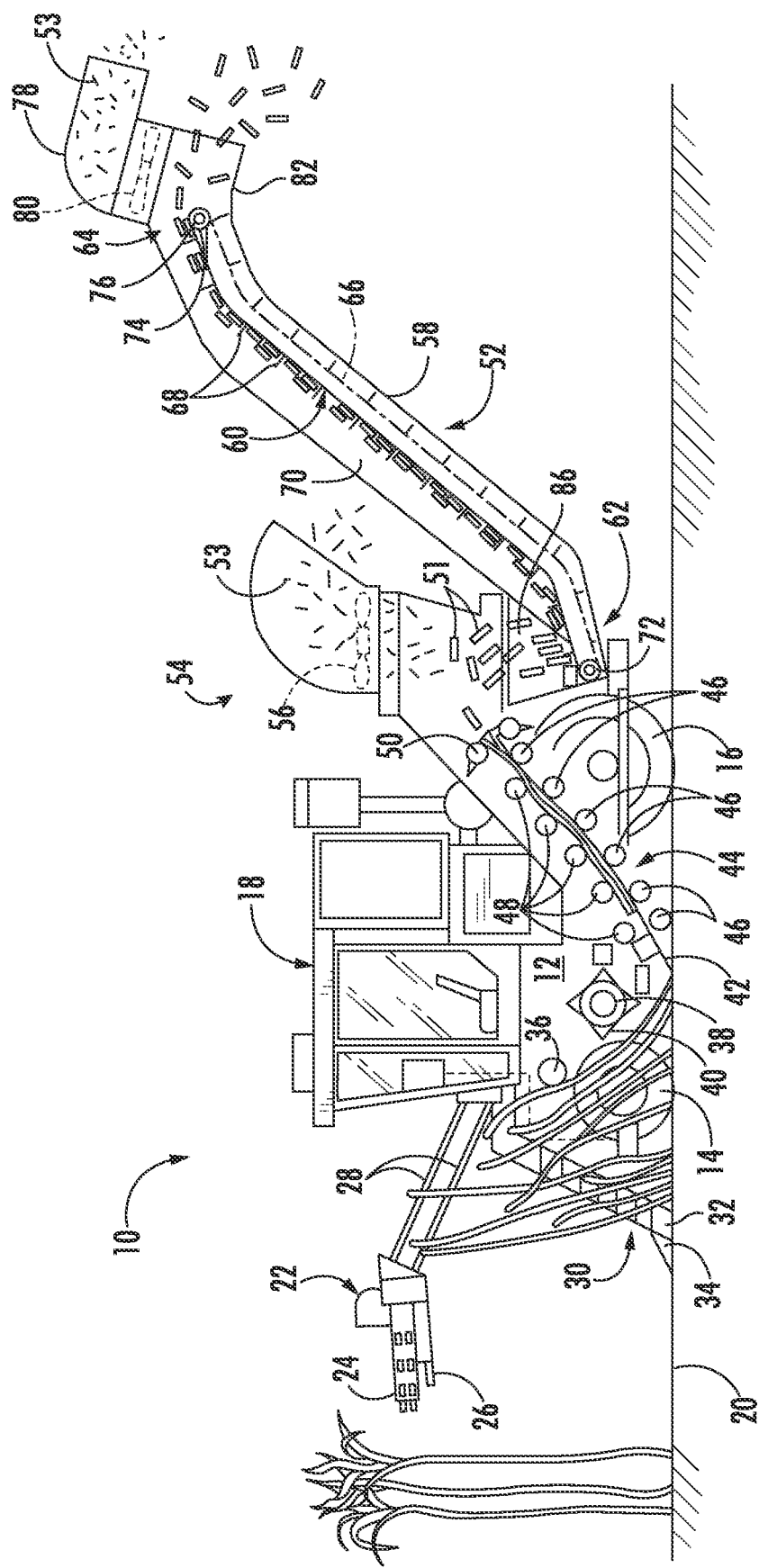
FIG. 1 illustrates a simplified, side view of one embodiment of an agricultural harvester in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a debris removal system for an agricultural harvester that includes a flow splitter configured to split or divide the stream of processed crop material flowing between the chopper assembly and the extractor of the harvester. Specifically, in several embodiments, the splitter is configured to be supported relative to an outlet of the chopper assembly such that the splitter divides the stream of processed crop material discharged from the outlet into two separate flows of material. In one embodiment, the splitter may be shaped or otherwise configured to divert the separate flows of material along flow paths that diverge slightly away from the center or middle of a downstream extraction chamber defined by the extractor, thereby creating a central crop-free (or substantially crop-free) void or "open flow area" within the extractor that allows for an increase in the airflow through the chamber. The increased airflow may, in turn, substantially improve the cleaning efficiency of the extractor, which may, for example, allow the harvester to accommodate increased throughput.

Referring now to the drawings, FIG. 1 illustrates a side view of one embodiment of an agricultural harvester 10 in accordance with aspects of the present subject matter. As shown, the harvester 10 is configured as a sugarcane harvester. However, in other embodiments, the harvester 10 may correspond to any other suitable agricultural harvester known in the art.

As shown in FIG. 1, the harvester 10 includes a frame 12, a pair of front wheels 14, a pair of rear wheels 16, and an operator's cab 18. The harvester 10 may also include a primary source of power (e.g., an engine mounted on the frame 12) which powers one or both pairs of the wheels 14, 16 via a transmission (not shown). Alternatively, the harvester 10 may be a track-driven harvester and, thus, may include tracks driven by the engine as opposed to the illustrated wheels 14, 16. The engine may also drive a hydraulic fluid pump (not shown) configured to generate pressurized hydraulic fluid for powering various hydraulic components of the harvester 10.

Additionally, the harvester 10 may include various components for cutting, processing, cleaning, and discharging sugar cane as the cane is harvested from an agricultural field 20. For instance, the harvester 10 may include a topper assembly 22 positioned at its front end to intercept sugar cane as the harvester 10 is moved in the forward direction. As shown, the topper assembly 22 may include both a gathering disk 24 and a cutting disk 26. The gathering disk 24 may be configured to gather the sugar cane stalks so that the cutting disk 26 may be used to cut off the top of each stalk. As is generally understood, the height of the topper assembly 22 may be adjustable via a pair of arms 28 hydraulically raised and lowered, as desired, by the operator.

Additionally, the harvester 10 may include a crop divider 30 that extends upwardly and rearwardly from the field 20. In general, the crop divider 30 may include two spiral feed rollers 32. Each feed roller 32 may include a ground shoe 34 at its lower end to assist the crop divider 30 in gathering the sugar cane stalks for harvesting. Moreover, as shown in FIG. 1, the harvester 10 may include a knock-down roller 36 positioned near the front wheels 14 and a fin roller 38 positioned behind the knock-down roller 36. As the knock-down roller 36 is rotated, the sugar cane stalks being harvested are knocked down while the crop divider 30 gathers the stalks from agricultural field 20. Further, as shown in FIG. 1, the fin roller 38 may include a plurality of intermittently mounted fins 40 that assist in forcing the sugar cane stalks downwardly. As the fin roller 38 is rotated during the harvest, the sugar cane stalks that have been knocked down by the knock-down roller 36 are separated and further knocked down by the fin roller 38 as the harvester 10 continues to be moved in the forward direction relative to the field 20.

Referring still to FIG. 1, the harvester 10 may also include a base cutter assembly 42 positioned behind the fin roller 38. As is generally understood, the base cutter assembly 42 may include blades (not shown) for severing the sugar cane stalks as the cane is being harvested. The blades, located on the periphery of the assembly 42, may be rotated by a hydraulic motor (not shown) powered by the vehicle's hydraulic system. Additionally, in several embodiments, the blades may be angled downwardly to sever the base of the sugar cane as the cane is knocked down by the fin roller 38.

Moreover, the harvester 10 may include a feed roller assembly 44 located downstream of the base cutter assembly 42 for moving the severed stalks of sugar cane from base cutter assembly 42 along the processing path. As shown in FIG. 1, the feed roller assembly 44 may include a plurality of bottom rollers 46 and a plurality of opposed, top pinch rollers 48. The various bottom and top rollers 46, 48 may be used to pinch the harvested sugar cane during transport. As the sugar cane is transported through the feed roller assembly 44, debris (e.g., rocks, dirt, and/or the like) may be allowed to fall through bottom rollers 46 onto the field 20.

In addition, the harvester 10 may include a chopper assembly 50 located at the downstream end of the feed roller assembly 44 (e.g., adjacent to the rearward-most bottom and top feed rollers 46, 48). In general, the chopper assembly 50 may be used to cut or chop the severed sugar cane stalks into pieces or "billets" 51, which may be, for example, six (6) inches long. The billets 51 may then be propelled towards an elevator assembly 52 of the harvester 10 for delivery to an external receiver or storage device (not shown).

As is generally understood, pieces of debris 53 (e.g., dust, dirt, leaves, etc.) separated from the sugar cane billets 51 may be expelled from the harvester 10 through a primary extractor 54, which is located immediately behind the chopper assembly 50 and is oriented to direct the debris 53 outwardly from the harvester 10. Additionally, an extractor fan 56 may be mounted within the primary extractor 54 for generating a suction force or vacuum sufficient to pick up the debris 53 and force the debris 53 through the primary extractor 54. The separated or cleaned billets 51, heavier than the debris 53 being expelled through the extractor 54, may then fall downward to the elevator assembly 52.

As shown in FIG. 1, the elevator assembly 52 may generally include an elevator housing 58 and an elevator 60 extending within the elevator housing 58 between a lower, proximal end 62 and an upper, distal end 64. In general, the elevator 60 may include a looped chain 66 and a plurality of flights or paddles 68 attached to and evenly spaced on the chain 66. The paddles 68 may be configured to hold the sugar cane billets 51 on the elevator 60 as the billets are elevated along a top span 70 of the elevator 70 defines between its proximal and distal ends 62, 64. Additionally, the elevator 60 may include lower and upper sprockets 72, 74 positioned at its proximal and distal ends 62, 64, respectively. As shown in FIG. 1, an elevator motor 76 may be coupled to one of the sprockets (e.g., the upper sprocket 74) for driving the chain 66, thereby allowing the chain 66 and the paddles 68 to travel in an endless loop between the proximal and distal ends 62, 64 of the elevator 60.

Moreover, in some embodiments, pieces of debris 53 (e.g., dust, dirt, leaves, etc.) separated from the elevated sugar cane billets 51 may be expelled from the harvester 10 through a secondary extractor 78 coupled to the rear end of the elevator housing 58. For example, the debris 53 expelled by the secondary extractor 78 may be debris remaining after the billets 51 are cleaned and debris 53 expelled by the primary extractor 54. As shown in FIG. 1, the secondary extractor 78 may be located adjacent to the distal end 64 of the elevator 60 and may be oriented to direct the debris 53 outwardly from the harvester 10. Additionally, an extractor fan 80 may be mounted at the base of the secondary extractor 78 for generating a suction force or vacuum sufficient to pick up the debris 53 and force the debris 53 through the secondary extractor 78. The separated, cleaned billets 51, heavier than the debris 53 expelled through the extractor 78, may then fall from the distal end 64 of the elevator 60. Typically, the billets 51 may fall downwardly through an elevator discharge opening 82 of the elevator assembly 52 into an external storage device (not shown), such as a sugar cane billet cart.

During operation, the harvester 10 is traversed across the agricultural field 20 for harvesting sugar cane. After the height of the topper assembly 22 is adjusted via the arms 28, the gathering disk 24 on the topper assembly 22 may function to gather the sugar cane stalks as the harvester 10 proceeds across the field 20, while the cutter disk 26 severs the leafy tops of the sugar cane stalks for disposal along either side of harvester 10. As the stalks enter the crop divider 30, the ground shoes 34 may set the operating width to determine the quantity of sugar cane entering the throat of the harvester 10. The spiral feed rollers 32 then gather the stalks into the throat to allow the knock-down roller 36 to bend the stalks downwardly in conjunction with the action of the fin roller 38. Once the stalks are angled downwardly as shown in FIG. 1, the base cutter assembly 42 may then sever the base of the stalks from field 20. The severed stalks are then, by movement of the harvester 10, directed to the feed roller assembly 44.

The severed sugar cane stalks are conveyed rearwardly by the bottom and top feed rollers 46, 48, which compress the stalks, make them more uniform, and shake loose debris to pass through the bottom rollers 46 to the field 20. At the downstream end of the feed roller assembly 44, the chopper assembly 50 cuts or chops the compressed sugar cane stalks into pieces or billets 51 (e.g., 6 inch cane sections). The processed crop material discharged from the chopper assembly 50 is then directed as a stream of billets 51 and debris 53 into the primary extractor 54. The airborne debris 53 (e.g., dust, dirt, leaves, etc.) separated from the sugar cane billets is then extracted through the primary extractor 54 using suction created by the extractor fan 56. The separated/cleaned billets 51 then fall downwardly through an elevator hopper 86 into the elevator assembly 52 and travel upwardly via the elevator 60 from its proximal end 62 to its distal end 64. During normal operation, once the billets 51 reach the distal end 64 of the elevator 60, the billets 51 fall through the elevator discharge opening 82 to an external storage device. If provided, the secondary extractor 78 (with the aid of the extractor fan 80) blows out trash/debris 53 from harvester 10, similar to the primary extractor 54.

Figure 2:
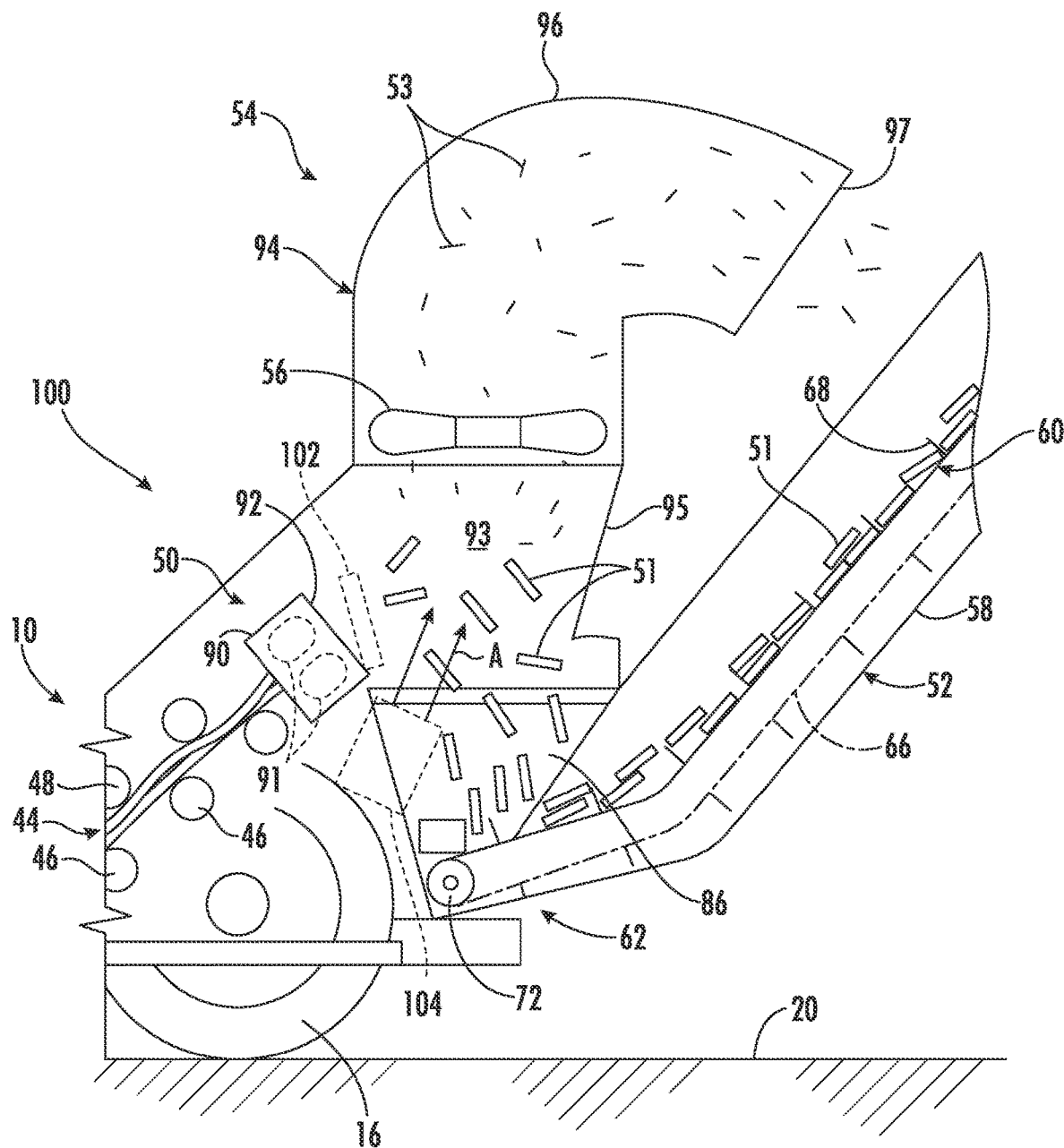
FIG. 2 illustrates a side view of a portion of the agricultural harvester shown in FIG. 1, particularly illustrating various components of one embodiment of a system for removing debris from an agricultural harvester in accordance with aspects of the present subject matter.

Referring now to FIG. 2, a side view of a portion of the agricultural harvester 10 shown in FIG. 1 is illustrated, particularly illustrating various components of one embodiment of a system 100 for removing debris from a harvester in accordance with aspects of the present subject matter. For purposes of discussion, the system 100 will generally be described herein with reference to the embodiment of the harvester 10 shown in FIG. 1. However, it should be appreciated that aspects of the disclosed system 100 may be incorporated into a harvester having any other suitable configuration.

In several embodiments, the system 100 may include one or more of the harvester components described above with reference to FIG. 1, such as the chopper assembly 50 and primary extractor 54. As shown in FIG. 2, the chopper assembly may generally include an outer housing 90 and one or more chopper elements (e.g., a pair of chopper drums 91) rotatably supported within the chopper housing 90. As is generally understood, the chopper elements 91 are configured to be rotatably driven within the housing 90 to cut or chop the harvested crop material received from the feed roller assembly 44, thereby generating a stream of processed crop material (e.g., including both billets 51 and debris 53) that is discharged from the chopper assembly 50 via an outlet 92 of the housing 90. The stream of processed crop material expelled from the outlet 92 of the chopper assembly 50 then flows into an extraction chamber 93 defined by an extractor housing 94 of the primary extractor 54, through which an airflow is generated (e.g., via the extractor fan 56) to separate the debris 53 from the billets 51. As shown in FIG. 2, the extractor housing 94 may include both a lower housing portion 95 and an upper housing portion 96 (also referred to as an extractor hood), with the lower housing portion 95 being generally positioned relative to the chopper assembly 50 such that the stream of processed crop material discharged from the chopper assembly 50 is received within the portion of the extraction chamber 93 defined by the lower housing portion 95. The debris 53 separated from the billets 51 within the extraction chamber 93 then flows upwardly through the extractor hood 96 and is expelled from the extractor 54 via an outlet 97 of the extractor housing 94.

Additionally, in accordance with aspects of the present subject matter, the system 100 may also include a flow splitter 102 positioned at or adjacent to the outlet 92 of the chopper assembly 50 to separate the stream of processed crop material discharged from the chopper assembly 50 into two separate flows of material. For instance, as will be described below, the flow splitter 102 may, in one embodiment, be centrally located relative to the outlet 92 of the chopper assembly 50 to allow the stream of processed crop material to be divided into two separate flows that are directed along flow paths that divert slightly away from the center or middle of the extraction chamber 93 defined by the extractor housing 94, thereby creating a central crop-free (or substantially crop-free) void within the extractor 54 that allows for an increase in the airflow through the chamber 93. The increased airflow may, in turn, substantially improve the cleaning efficiency of the extractor 54, which may, for example, allow the harvester 10 to accommodate increased throughput.

Moreover, in one embodiment, the harvester 10 may also include an optional secondary fan assembly 104 positioned below the stream of crop material discharged from the chopper assembly 50 (and split into two separate flows via the flow splitter 102) to direct a supplemental flow of air A through the processed crop material to further facilitate separation of the debris 53 from the billets 51 for removal by the extractor 54. For example, as shown in FIG. 2, in one embodiment, the secondary fan assembly 104 may be located adjacent to the outlet 92 of the chopper assembly 50, such as at a location below the flow splitter 102. In such an embodiment, the fan assembly 104 may be oriented so as to blow the stream of air A through the split flows of crop material downstream of the flow splitter 102 in the direction of the extractor hood 96. As previously described, the debris 53 extracted by the extractor 54 is then directed out of and away from harvester 10, e.g., through the outlet 97 of the extractor hood 96.

Figure 3:
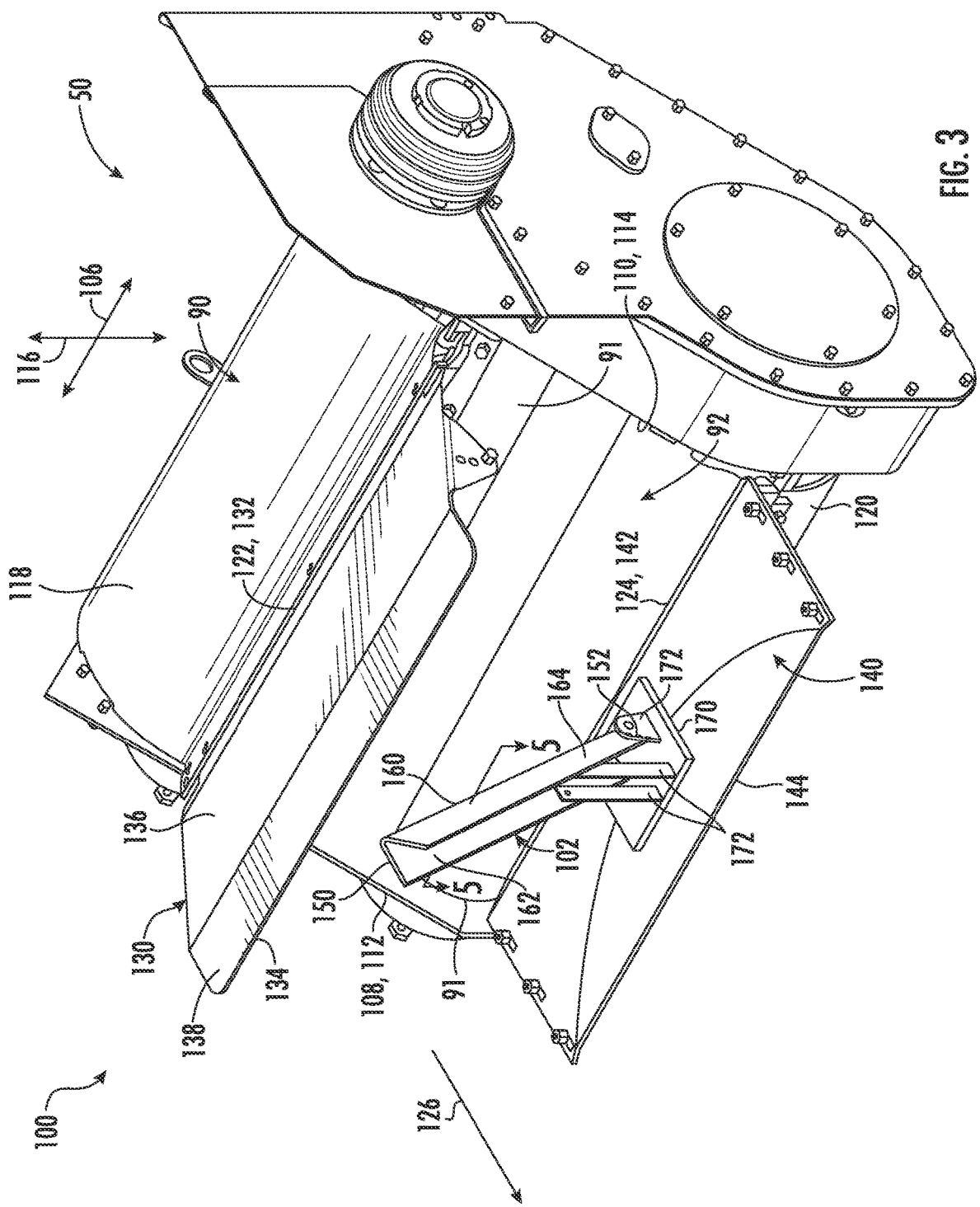
FIG. 3 illustrates a perspective view of one embodiment of a flow splitter suitable for use within a system for removing debris from an agricultural harvester in accordance with aspects of the present subject matter, particularly illustrating the flow splitter installed relative to a chopper assembly and opposed upper and lower plates of the harvester.
Figure 4:
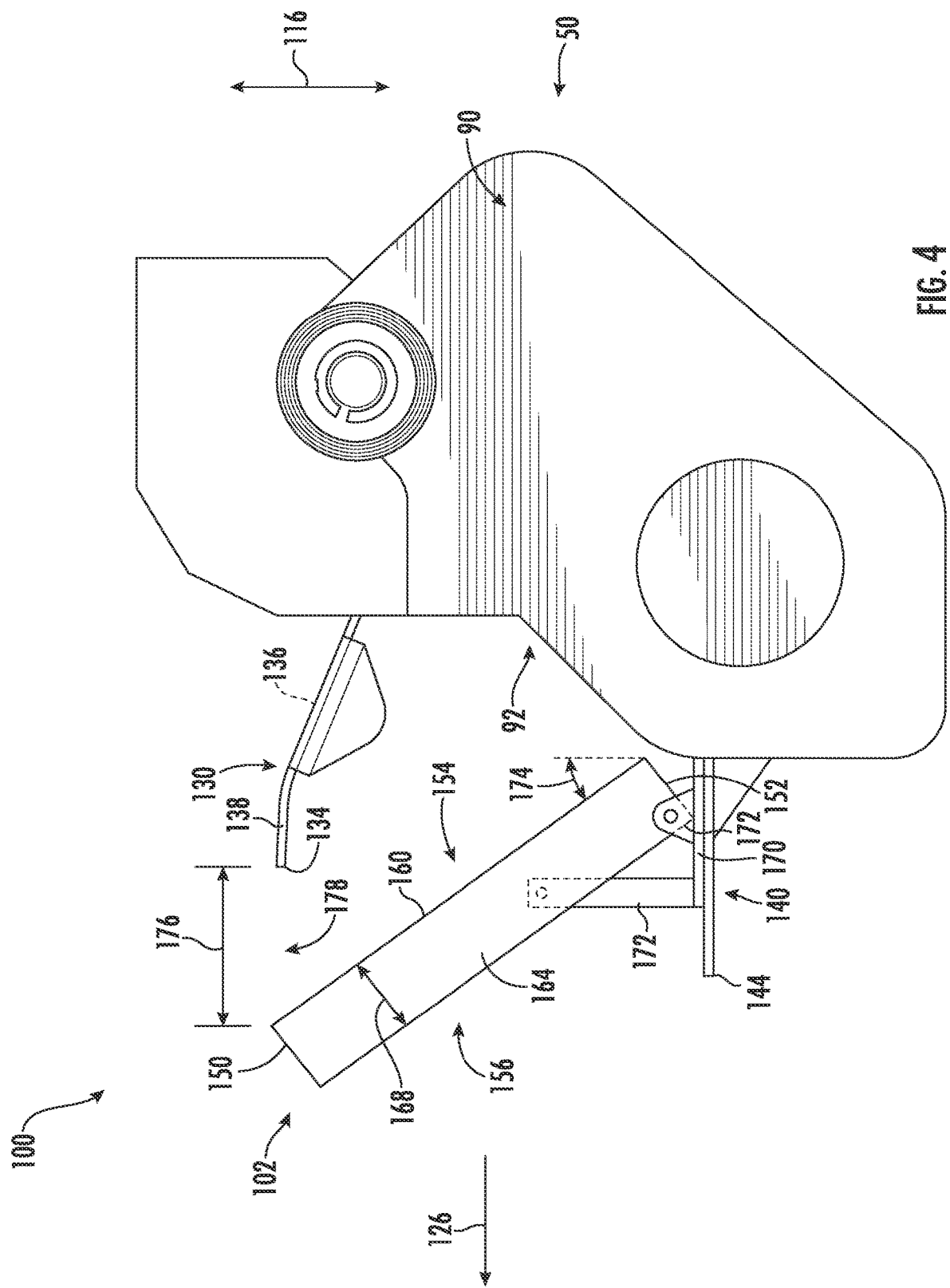
FIG. 4 illustrates a side view of the flow splitter and other harvester components shown in FIG. 3.
Figure 5:
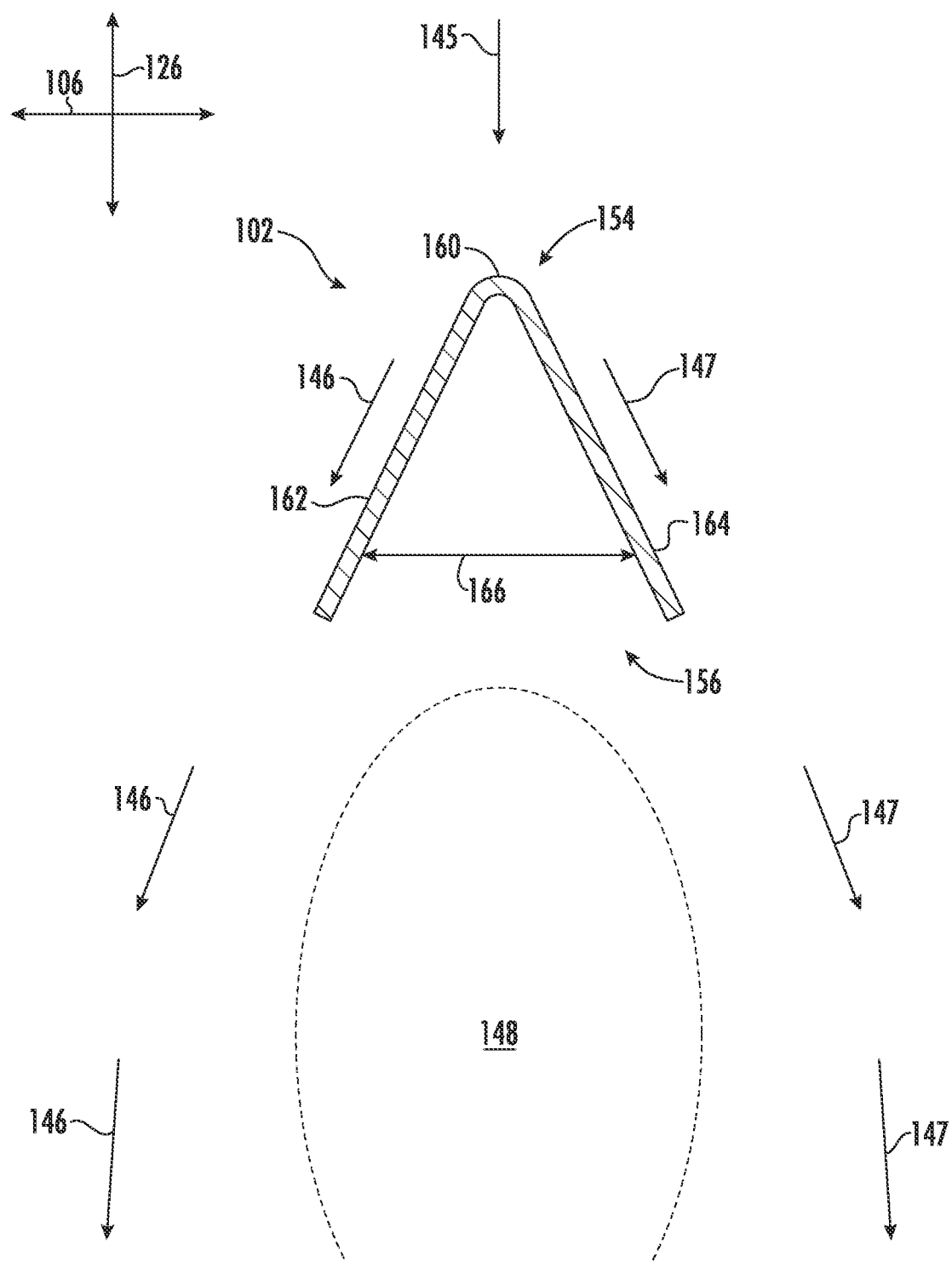
FIG. 5 illustrates a cross-sectional view of the flow splitter show in FIG. 3 taken about line 5-5.

Referring now to FIGS. 3-5, differing views of one embodiment of components suitable for use within the system 100 described above are illustrated in accordance with aspects of the present subject matter, particularly illustrating an exemplary embodiment of a flow splitter 102 for use within the system 100. Specifically, FIGS. 3 and 4 illustrate perspective and side views, respectively, of the flow splitter 102 installed relative to the chopper assembly 50. Additionally, FIG. 5 illustrates a cross-sectional view of the flow splitter 102 shown in FIG. 3 taken about line 5-5.

As indicated above, the chopper assembly 50 may include a chopper housing 90, with the outlet 92 of the chopper assembly 50 being formed by an opening defined through an aft or rearward end of the housing 90. For example, as shown in FIG. 3, the outlet 92 is defined in a lateral direction (indicated by arrow 106) between opposed first and second sidewalls 108, 110 of the chopper housing 90 such that the sidewalls 108, 110 defined respective first and second lateral sides 112, 114 of the outlet 92. In such an embodiment, the lateral sides 112, 114 of the outlet 92 defined by opposed sidewalls 108, 110 of the housing 90 may generally define lateral flow boundaries of the processed crop material discharged from the chopper assembly 50. Additionally, as shown in FIG. 3, the outlet 92 is defined in a vertical direction (indicated by arrow 116) between opposed top and bottom housing portions 118, 120 of the chopper housing such that the opposed housing portions 118, 120 define respective top and bottom ends 122, 124 of the outlet 92. In such an embodiment, the top and bottom ends 122, 124 of the outlet 92 defined by the opposed housing portions 118, 120 of the chopper housing 90 may generally define vertical flow boundaries of the processed crop material discharged from the outlet 92.

Moreover, in several embodiments, the system 100 may also include upper and lower walls or plates extending outwardly from the chopper housing 90 at locations adjacent to the top and bottom ends 122, 124, respectively, of the outlet 92. Specifically, as shown in FIGS. 3 and 4, an upper wall or plate 130 may be supported adjacent to a portion of the chopper housing 90 (e.g., the top housing portion 118) such that the upper plate 130 extends outwardly from chopper housing 90 adjacent to the top end 122 of the outlet 92. For example, as particularly shown in FIG. 3, the upper plate 130 may include an upstream end 132 positioned directly adjacent to the top end 122 of the outlet 92 and a downstream end 134 spaced apart from the chopper assembly 50 in the direction of flow of the processed crop material (indicated by arrow 126). In such an embodiment, the upper plate 130 may form a continuation of the upper flow boundary defined by the top end 122 of the outlet 92 so that crop material expelled from the outlet 92 at its top end 122 flows along the upper plate 130 between the plate's upstream and downstream ends 132, 134. In addition, the upper plate 130 may also function as a deflector plate configured to redirect or deflect the uppermost portions of the stream of processed crop material discharged from the outlet 92. For example, as particularly shown in FIGS. 3 and 4, the upper plate 130 may include first and second angled wall portions 136, 138 extending between its upstream and downstream ends 132, 134, with the angled wall portions 136, 138 being oriented at differing angles relative to the flow of processed crop material to allow the stream to be properly diverted into the extraction chamber 93 (FIG. 2) of the extractor housing 94 positioned downstream of the chopper assembly 50.

Moreover, as shown in FIGS. 3 and 4, a lower wall or plate 140 may be supported adjacent to a portion of the chopper housing 90 (e.g., the bottom housing portion 120) such that the lower plate 140 extends outwardly from chopper housing 90 adjacent to the bottom end 124 of the outlet 92. For example, as particularly shown in FIG. 3, the lower plate 140 may include an upstream end 142 positioned directly adjacent to the bottom end 124 the outlet 92 and a downstream end 144 spaced apart from the chopper assembly 50 in the flow direction 126 of the processed crop material. In such an embodiment, the lower plate 140 may form a continuation of the lower flow boundary defined by the bottom end 124 of the outlet 92. In addition, the lower plate 140 may also function as a support plate or member for supporting the flow splitter 102 within the stream of processed material discharged from the chopper assembly 50. For example, as will be described below, the lower plate 102 may, in one embodiment, be configured to support the flow splitter 102 within the stream of processed material via a cantilevered arrangement.

As indicated above, the disclosed flow splitter 102 may be configured to be supported relative to the outlet 92 of the chopper assembly 50 such that the flow splitter 102 is positioned at least partially within the stream of processed crop material discharged from the chopper assembly 50, thereby allowing the splitter 102 to divert the stream into separate flows of processed crop material. Specifically, in several embodiments, the flow splitter 102 may be positioned immediately downstream of the outlet 92 of the chopper assembly 50 at a centralized location relative to the stream of processed crop material, thereby allowing the flow splitter 102 to divert the processed crop material away from the center of the downstream extraction chamber 93 (FIG. 2) as the divided streams of material flow into the extractor housing 94 (FIG. 2). For example, as shown in FIG. 3, the flow splitter 102 may be positioned relative to the chopper assembly 50 in the lateral direction 106 so as to be aligned with the center of the outlet 92 defined between the opposed sidewalls 108, 110 of the chopper housing 90.

In general, the flow splitter 102 may have any suitable configuration and may correspond to any suitable member or component that allows the splitter 102 to function as a flowing splitting device when the splitter 102 is positioned within the stream of processed crop material discharged from the chopper assembly 50. For example, in several embodiments, the flow splitter 102 may correspond to an elongated member extending longitudinally between an upper end 150 and a lower end 152 and defining opposed upstream and downstream sides 154, 156 (FIGS. 4 and 5) relative to the flow direction 126 of the crop material across the splitter 102.

In a particular embodiment of the present subject matter, the flow splitter 102 may define a V-shaped profile. For example, as particularly shown in FIG. 5, the flow splitter 102 may include a leading edge 160 positioned along its upstream side 154 and first and second diverging sidewalls 162, 164 extending from the leading edge 160 towards the downstream side 156 of the flow splitter 102. Specifically, the sidewalls 162, 164 may diverge away from each other in the lateral direction 106 as the sidewalls 162, 164 extend from the leading edge 160 to the downstream side 156 of the flow splitter 102 such that a lateral width 166 (FIG. 5) of the splitter 102 increases between its upstream and downstream sides 154, 156, thereby forming the "V-shaped" profile of the splitter 102. In such an embodiment, the stream of processed crop material discharged from the outlet 90 (e.g., as indicated by arrow 145 in FIG. 5) may initially contact or encounter the leading edge 160 of the splitter 102, which, in turn, may divide the stream of processed crop material into two separate flows of material (e.g., as indicated by arrows 146 and 147 in FIG. 5). Each separate material flow 146, 147 may then be directed along the adjacent sidewall 162, 164 of the splitter 102 such that the processed crop material is diverted along diverging flow paths as the material flows past the flow splitter 102 and into the downstream extraction chamber 93 (FIG. 2) of the extractor housing 94. As a result, a crop-free or substantially crop-free zone or "open flow area" (e.g., as indicated in FIG. 5 by the area within the dashed shape 148) may be created downstream of the flow splitter 102 between the separate, diverging flows of crop material 146, 147. This open flow area 148 may provide for increased airflow through the extraction chamber 93, thereby allowing for the cleaning efficiency of the extractor 54 to be improved.

It should be appreciated that, in the illustrated embodiment, the first and second sidewalls 162, 164 of the flow splitter 102 are configured as straight or planar walls and, thus, define a straight or planar profile as they extend both from the leading edge 160 of the flow splitter 102 towards the downstream side 156 of the splitter 102 and from the upper end 150 of the splitter 102 to the lower end 152 of the splitter 102. However, in other the embodiments, the sidewalls 162, 164 may be configured as curved or arcuate walls. For instance, as will be described below, each sidewall 162, 164 may define a curved or arcuate profile as it extends between the upstream and downstream sides 154, 156 of the flow splitter 102 and/or between the upper and lower ends 150, 152 of the splitter 102. Additionally, as shown in FIG. 4, each sidewall 162, 164 defines a constant or uniform depth 168 between the upstream and downstream sides 154, 156 of the splitter 102 as the splitter 102 extends longitudinally between its upper and lower ends 150, 152. However, as will be described below, the sidewalls 162, 164 may, instead, define a depth that tapers or varies as the splitter 102 extends longitudinally between its upper and lower ends 150, 152.

As indicated above, in one embodiment, the flow splitter 102 may be configured to be cantilevered from the lower wall or support plate 140 extending outwardly from the chopper assembly 50. Specifically, as shown in FIG. 4, the lower end 152 of the flow splitter 102 may be coupled to the lower plate 140 via suitable mounting structure (e.g., via a mounting plate 170 and one or more mounting brackets 172), with the upper end 150 of the flow splitter 102 corresponding to a free or unsupported end of the flow splitter 102. In such an embodiment, the flow splitter 102 may be cantilevered in an angled orientation relative to the chopper assembly 50 and/or the opposed plates 130, 140. For instance, as shown in FIG. 4, the flow splitter 102 is mounted to the lower plate 140 so as to be angled away from the outlet 92 of the chopper assembly 50 (e.g., by orienting the leading edge 160 of the flow splitter 102 at a given angle 174 relative to the vertical direction 116, such as an angle ranging from 15 degrees to 45 degrees from vertical). In such an embodiment, the angular orientation of the flow splitter 102 may be selected, for example, such that the upper end 150 of the flow splitter 102 is positioned downstream of or otherwise is spaced apart from the downstream end 134 of the upper plate 130. For instance, as shown in FIG. 4, given the angular orientation of the flow splitter 102, the upper end 150 of the flow splitter 102 is spaced apart from the downstream end 134 of the upper plate 130 by a given distance 176, thereby creating a flow gap 178 between the splitter 102 and the upper plate 130 through which a portion of the processed crop material discharged from the outlet 92 may be directed. In particular, crop material that directly contacts the leading edge 160 of the flow splitter 102 may flow up along the leading edge 160 and through the flow gap 178 defined between the splitter 102 and the upper plate 130 to prevent any plugging at the location of the splitter 102.

Figure 6:
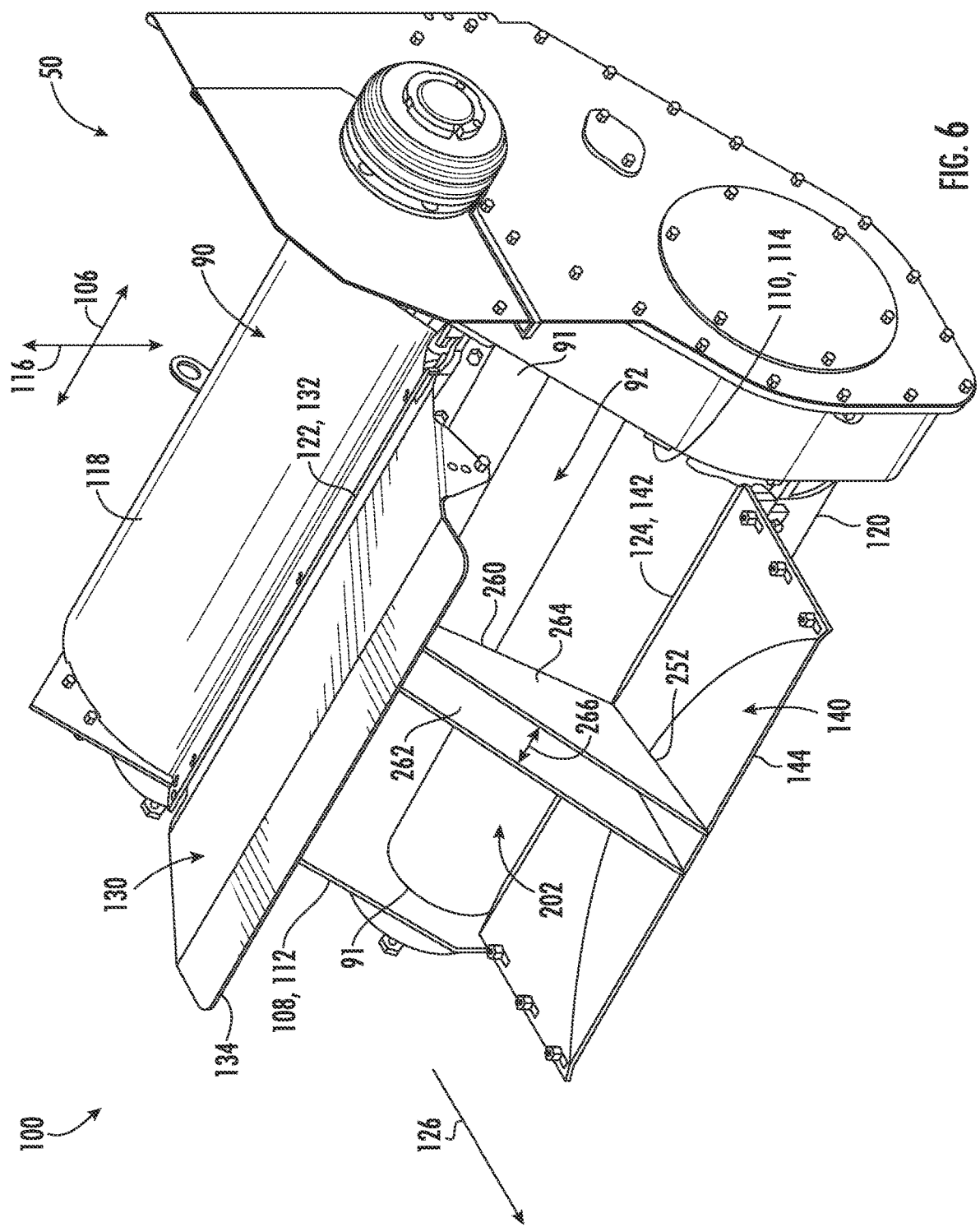
FIG. 6 illustrates a perspective view of another embodiment of a flow splitter suitable for use within a system for removing debris from an agricultural harvester in accordance with aspects of the present subject matter, particularly illustrating the flow splitter installed relative to a chopper assembly and opposed upper and lower plates of the harvester.
Figure 7:
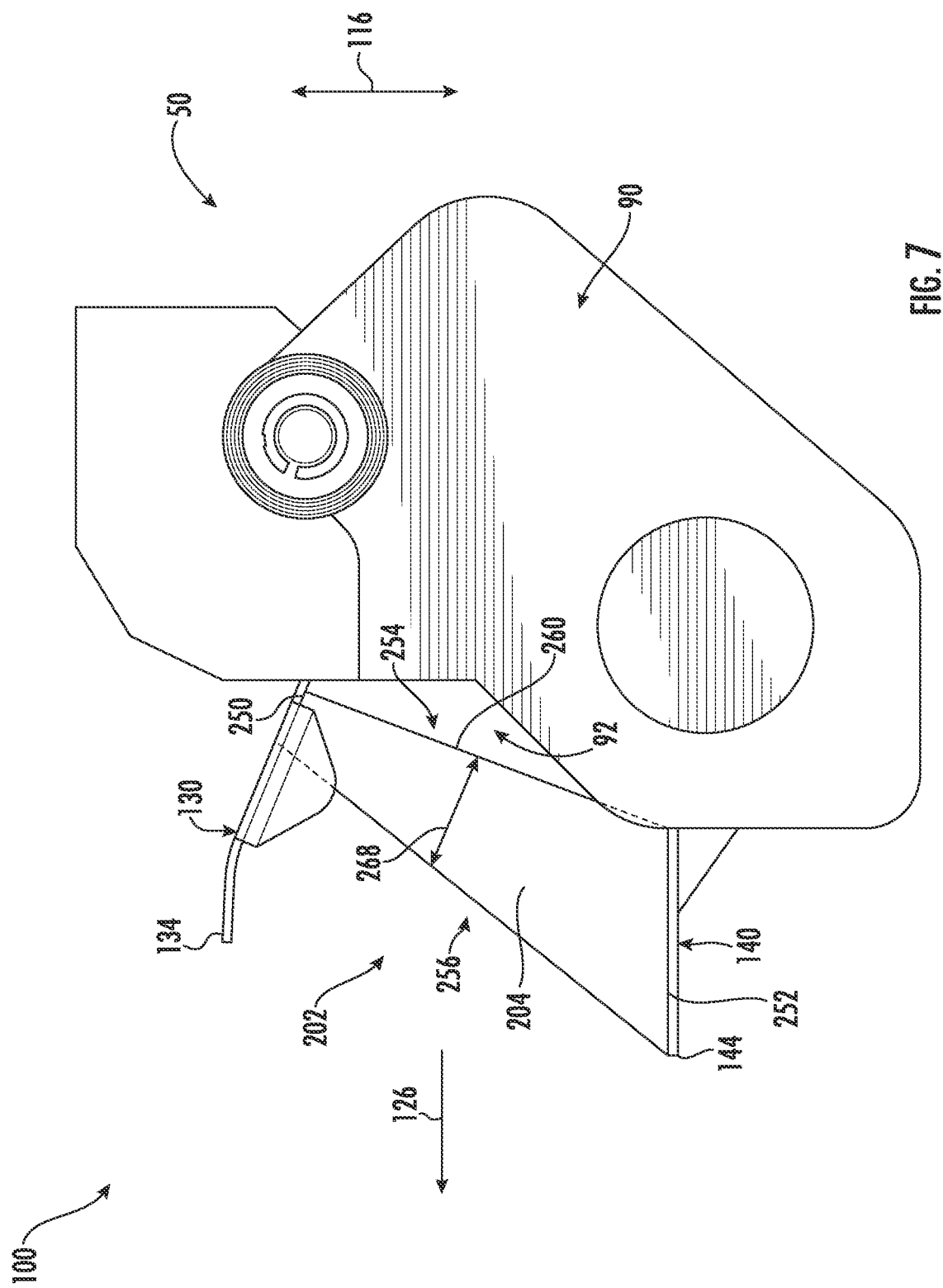
FIG. 7 illustrates a side view of the flow splitter and other harvester components shown in FIG. 6.

Referring now to FIGS. 6 and 7, differing views of another embodiment of a flow splitter 202 suitable for use within the disclosed system 100 are illustrated in accordance with aspects of the present subject matter. Specifically, FIGS. 6 and 7 illustrate perspective and side views, respectively, of the flow splitter 202 installed relative to the various other system components described above with reference to FIGS. 3-5, such as the chopper assembly 50 and the upper and lower plates 130, 140.

In general, the flow splitter 202 is configured the same as or similar to the flow splitter 102 described above with reference to FIGS. 3-5. Thus, the features or elements of the splitter 202 that are the same as or similar to corresponding features of elements of the splitter 102 described above with reference to FIGS. 3-5 will be designated by the same reference character with a value of one-hundred added thereto. In addition, it should be appreciated that that the splitter 202 may generally be configured to perform the same or similar function as the splitter 102 described above, such as by dividing the flow of processed crop material discharged from the chopper assembly 50 into separate flows of material to allow for enhanced airflow through the downstream extraction chamber 93 (FIG. 2).

As particularly shown in FIG. 7, the flow splitter 202 corresponds to an elongated member extending longitudinally between an upper end 250 and a lower end 252 and defining opposed upstream and downstream sides 254, 256 relative to the flow direction 126 of the crop material across the splitter 202. Additionally, similar to the embodiment described above, the flow splitter may, in one embodiment, define a V-shaped profile. For example, the flow splitter 202 may include a leading edge 260 positioned along its upstream side 254 and first and second diverging sidewalls 262, 264 extending from the leading edge 260 towards the downstream side 256 of the flow splitter 202. In such an embodiment, the sidewalls 262, 264 may diverge away from each other such that a lateral width 266 (FIG. 6) of the splitter 202 increases as the sidewalls 262, 264 extend between the upstream and downstream sides 254, 256 of the splitter 202.

However, unlike the cantilevered embodiment described above, the illustrated flow splitter 202 is mounted or otherwise supported directly between the upper and lower plates 130, 140. Specifically, as shown in FIG. 7, the flow splitter 202 is mounted on or otherwise supported relative to the upper and lower plates 130, 140 such that the upper end 250 of the splitter 202 is positioned directly adjacent to a portion of the upper plate 130 and the lower end 252 of the splitter 202 is positioned directly adjacent to a portion of the lower plate 140. For example, in one embodiment, the opposed upper and lower ends 250, 252 of the flow splitter 202 may be directly coupled to the upper and lower plates 130, 140, respectively, such as by welding each end 250, 252 to the adjacent plate 130, 140 or by using suitable mechanical fasteners to couple each end 250, 252 to the adjacent plate 130, 140.

Additionally, unlike the embodiment described above in which the sidewalls define a constant or uniform depth along the length of the splitter 102, the sidewalls 262, 264 of the flow splitter 202 shown in FIGS. 6 and 7 define a varying or tapered depth 268 (FIG. 7) along the length of the flow splitter 202. Specifically, as shown in FIG. 7, the depth 268 of each sidewall 262, 264 tapers as it extends lengthwise from the lower end 252 of the splitter 202 to the upper end 250 of the splitter 202 such that the sidewall depth 268 at the lower end 252 of the splitter 202 is greater than the sidewall depth 268 at the upper end 250 of the splitter 202. Moreover, as shown in FIG. 7, unlike the embodiment described above, the leading edge 260 of the flow splitter 202 is angled towards the outlet 92 of the chopper assembly 50 (as opposed to being angled away from the chopper outlet 92 as in the embodiment of FIGS. 3-5).

Figure 8:
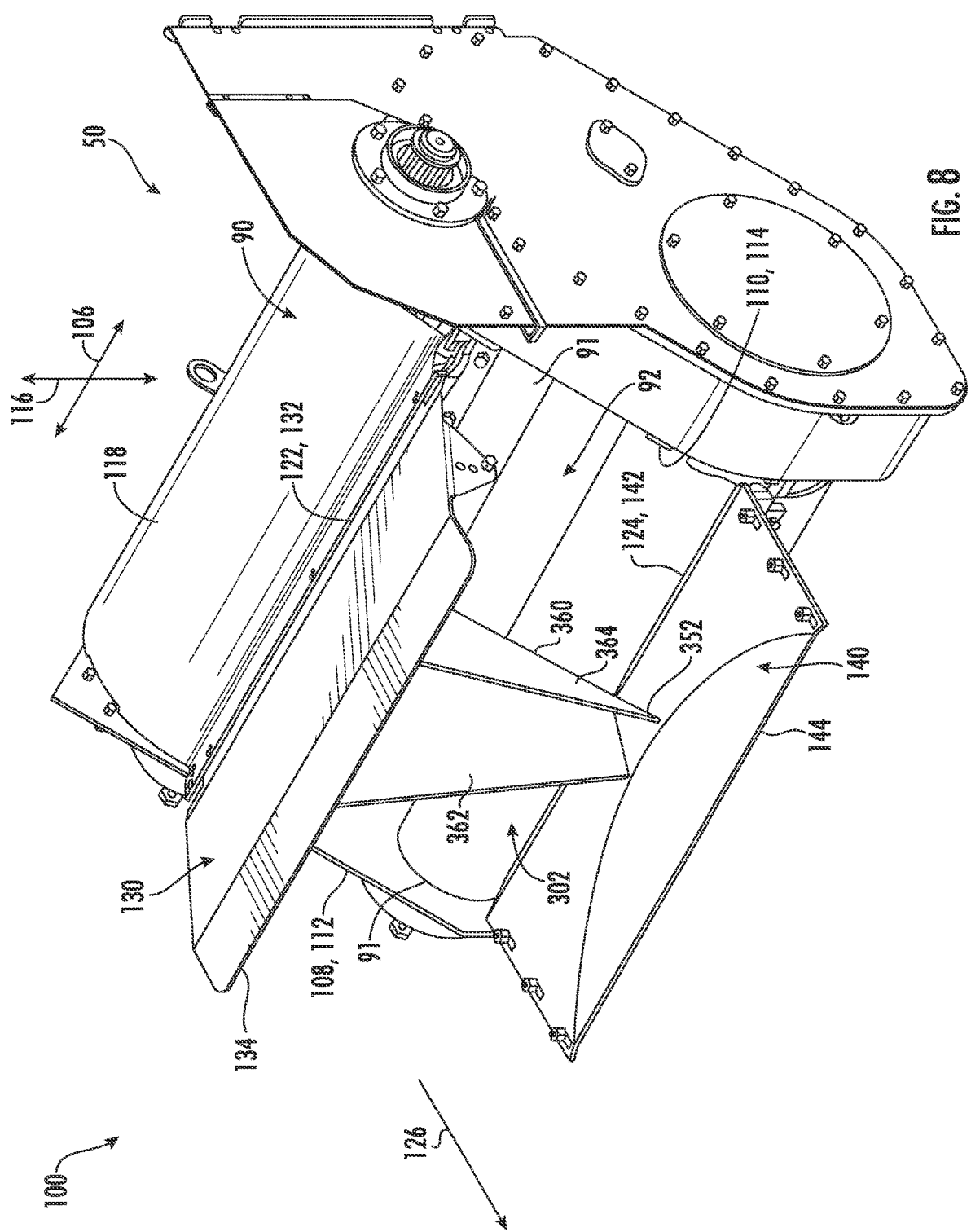
FIG. 8 illustrates a perspective view of yet another embodiment of a flow splitter suitable for use within a system for removing debris from an agricultural harvester in accordance with aspects of the present subject matter, particularly illustrating the flow splitter installed relative to a chopper assembly and opposed upper and lower plates of the harvester.
Figure 9:
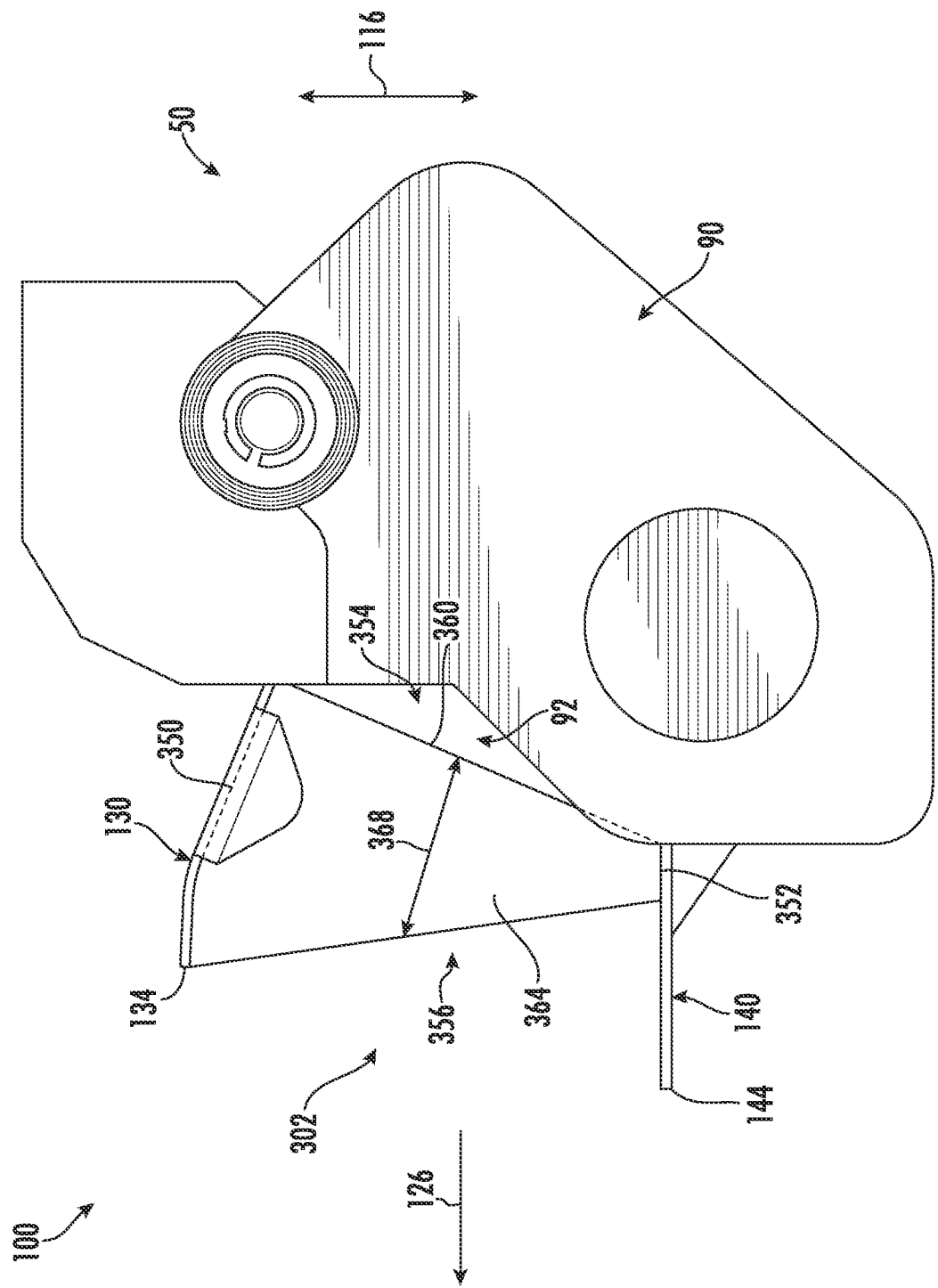
FIG. 9 illustrates a side view of the flow splitter and other harvester components shown in FIG. 8.
Figure 10:
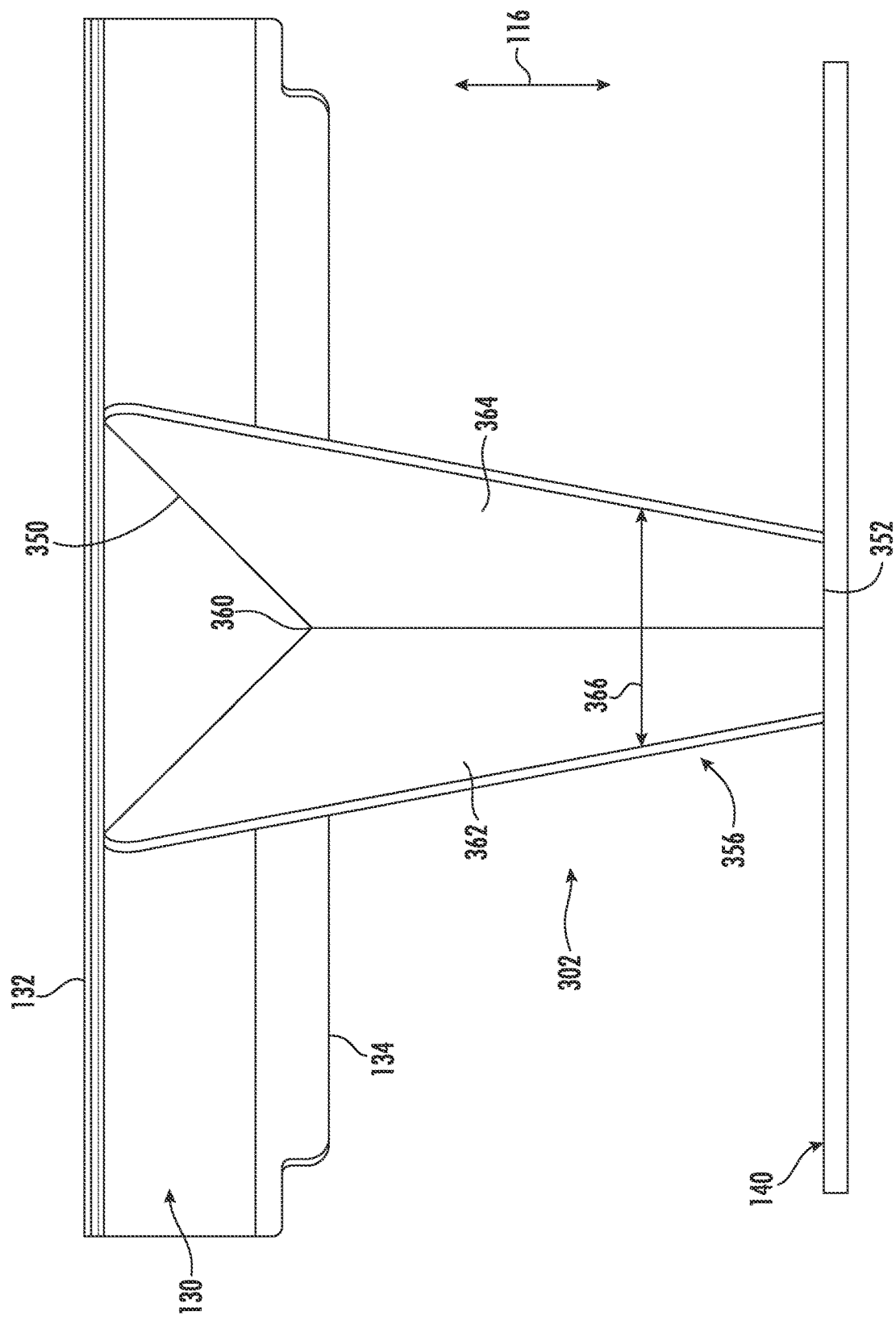
FIG. 10 illustrates a rear view of the flow splitter shown in FIGS. 8 and 9 as installed between the opposed upper and lower plates of the harvester.

Referring now to FIGS. 8-10, differing views of yet another embodiment of a flow splitter 302 suitable for use within the disclosed system 100 are illustrated in accordance with aspects of the present subject matter. Specifically, FIGS. 8 and 9 illustrate perspective and side views, respectively, of the flow splitter 302 installed relative to the various other system components described above with reference to FIGS. 3-7, such as the chopper assembly 50 and the upper and lower plates 130, 140. Additionally, FIG. 10 illustrates a rear view of the flow splitter shown in FIGS. 8 and 9 as installed between the upper and lower plates 130, 140.

In general, the flow splitter 302 is configured the same as or similar to the flow splitter 202 described above with reference to FIGS. 6 and 7. Thus, the features or elements of the splitter 302 that are the same as or similar to corresponding features of elements of the splitter 202 described above with reference to FIGS. 6 and 7 will be designated by the same reference character with a value of one-hundred added thereto. In addition, it should be appreciated that that the splitter 302 may generally be configured to perform the same or similar function as the various other splitter embodiments described herein, such as by dividing the flow of processed crop material discharged from the chopper assembly 50 into separate flows of material to allow for enhanced airflow through the downstream extraction chamber 93 (FIG. 2).

As particularly shown in FIG. 9, the flow splitter 302 corresponds to an elongated member extending longitudinally between an upper end 350 and a lower end 352 and defining opposed upstream and downstream sides 354, 356 relative to the flow direction 126 of the crop material across the splitter 302. Moreover, as shown in FIG. 9, the flow splitter 302 is configured to be mounted or otherwise supported directly between the upper and lower plates 130, 140. For instance, in the illustrated embodiment, the flow splitter 302 is mounted on or otherwise supported relative to the upper and lower plates 130, 140 such that the upper end 350 of the splitter 302 is positioned directly adjacent to a portion of the upper plate 130 and the lower end 352 of the splitter 302 is positioned directly adjacent to a portion of the lower plate 140.

Additionally, similar to the embodiment described above, the flow splitter may, in one embodiment, define a V-shaped profile. For example, the flow splitter 302 may include a leading edge 360 positioned along its upstream side 354 and first and second diverging sidewalls 362, 364 extending from the leading edge 360 towards the downstream side 356 of the flow splitter 302. In such an embodiment, the sidewalls 362, 364 may diverge away from each other such that a lateral width 366 (FIG. 10) of the splitter 302 increases as the sidewalls 362, 364 extend between the upstream and downstream sides 354, 356 of the splitter 302. However, unlike the embodiment described above with reference to FIGS. 6 and 7, the sidewalls 362, 364 diverge away from each other at differing rates along the vertical length of the splitter 302 such that the lateral width 366 of the splitter 302 along its downstream side 356 differs between the upper and lower ends 350, 352 of the splitter 302. Specifically, as shown in FIG. 10, the downstream lateral width 366 of the splitter 392 is greatest at the upper end 350 of the splitter 302 and tapers down as the splitter 302 extends lengthwise from its upper end 350 to its lower end 352. Such additional outward flaring of the sidewalls 362, 364 as the flow splitter 302 extends vertically between the upper and lower plates 130, 140 may facilitate enhanced spreading or divergence of the separate material flows created by the flow splitter 302 as the processed crop flow as is directed across the splitter 302 and subsequently flows downstream into the extraction chamber 93 (FIG. 2) of the extractor housing 94.

Additionally, the sidewalls 362, 364 of the flow splitter 302 shown in FIGS. 8-10 define a varying or tapered depth 368 (FIG. 9) along the vertical length of the splitter 302. However, unlike the embodiment described above with reference to FIGS. 6 and 7, the depth 368 of each sidewall 362, 364 tapers as it extends lengthwise from the upper end 350 of the splitter 302 to the lower end 352 of the splitter 302. As a result, the depth 368 of each sidewall 362, 364 is greater at the upper end 350 of the splitter 302 than at the lower end 352 of the splitter 302.

Figure 11:
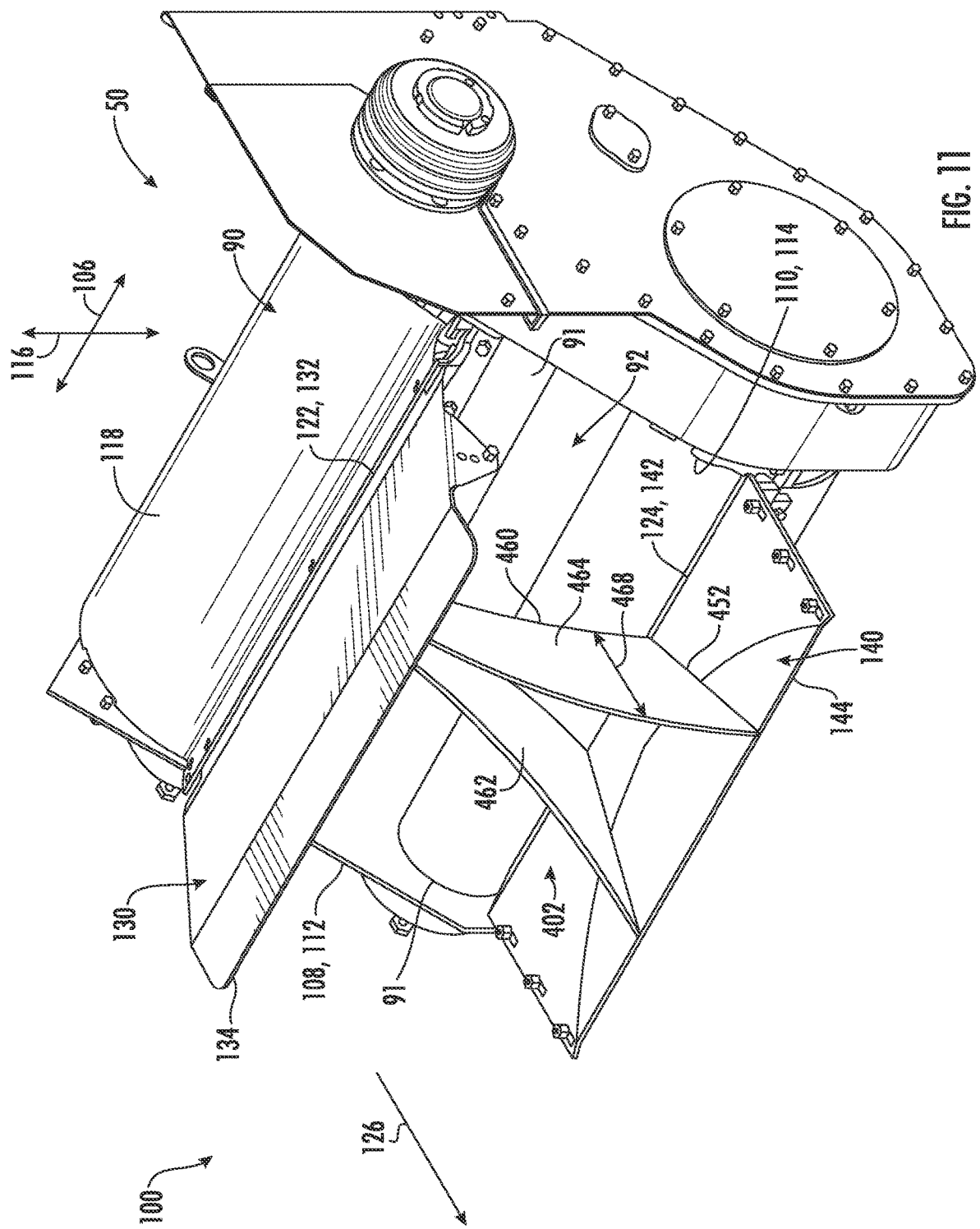
FIG. 11 illustrates a perspective view of a further embodiment of a flow splitter suitable for use within a system for removing debris from an agricultural harvester in accordance with aspects of the present subject matter, particularly illustrating the flow splitter installed relative to a chopper assembly and opposed upper and lower plates of the harvester.
Figure 12:
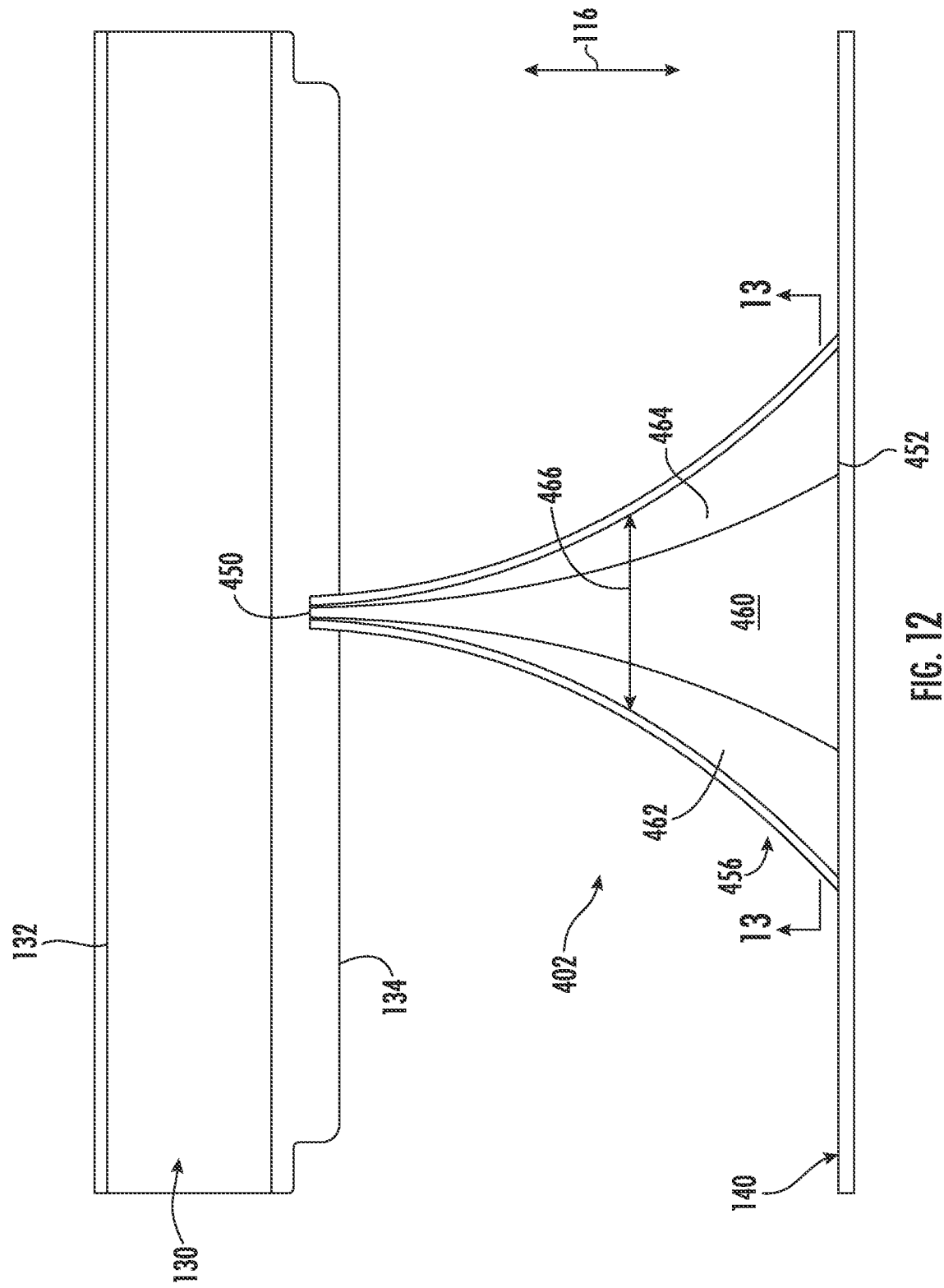
FIG. 12 illustrates a rear view of the flow splitter shown in FIG. 11 as installed between the opposed upper and lower plates of the harvester.
Figure 13:
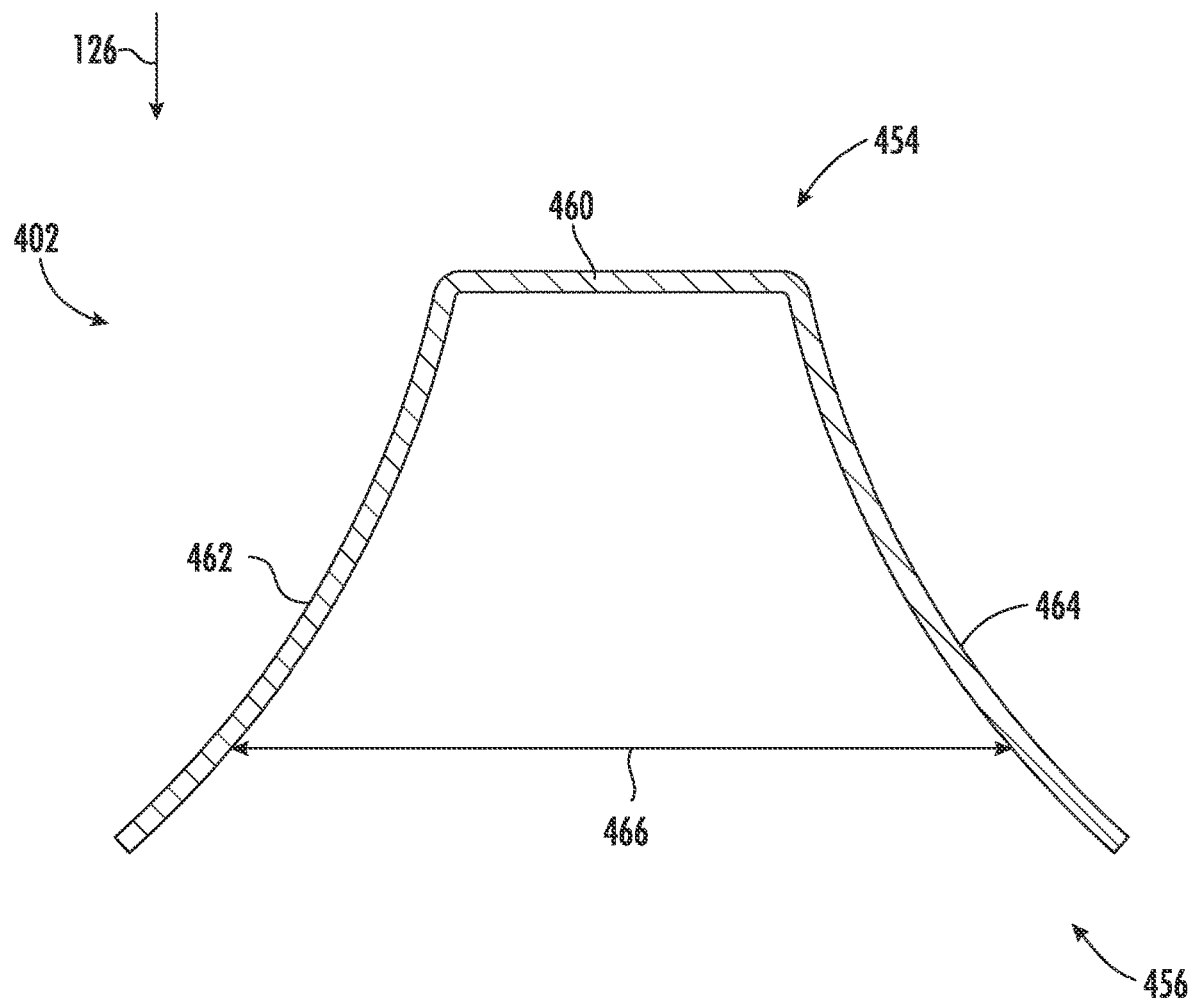
FIG. 13 illustrates a cross-sectional view of the flow splitter show in FIG. 12 taken about line 13-13.

Referring now to FIGS. 11-13, differing views of a further embodiment of a flow splitter 402 suitable for use within the disclosed system 100 are illustrated in accordance with aspects of the present subject matter. Specifically, FIG. 11 illustrates a perspective view of the flow splitter 402 installed relative to the various other system components described above with reference to FIGS. 3-10, such as the chopper assembly 50 and the upper and lower plates 130, 140. Additionally, FIG. 12 illustrates a rear view of the flow splitter 402 shown in FIG. 11 as installed between the upper and lower plates 130, 140, while FIG. 13 illustrates a cross-sectional view of the flow splitter shown in FIG. 12 taken about line 13-13.

In general, the flow splitter 402 is configured the same as or similar to the flow splitter 302 described above with reference to FIGS. 8-10. Thus, the features or elements of the splitter 402 that are the same as or similar to corresponding features of elements of the splitter 302 described above with reference to FIGS. 8-10 will be designated by the same reference character with a value of one-hundred added thereto. In addition, it should be appreciated that that the splitter 402 may generally be configured to perform the same or similar function as the various other splitter embodiments described herein, such as by dividing the flow of processed crop material discharged from the chopper assembly 50 into separate flows of material to allow for enhanced airflow through the downstream extraction chamber 93 (FIG. 2).

As shown in the illustrated embodiment, the flow splitter 402 corresponds to an elongated member extending longitudinally between an upper end 450 (FIG. 12) and a lower end 452 (FIG. 12) and defining opposed upstream and downstream sides 454, 456 (FIG. 13) relative to the flow direction 126 of the crop material across the splitter 402. Moreover, the flow splitter 402 is configured to be mounted or otherwise supported directly between the upper and lower plates 130, 140. For instance, as particularly shown in FIG. 12, the flow splitter 402 is mounted on or otherwise supported relative to the upper and lower plates 130, 140 such that the upper end 450 of the splitter 402 is positioned directly adjacent to a portion of the upper plate 130 and the lower end 452 of the splitter 402 is positioned directly adjacent to a portion of the lower plate 140.

However, unlike the V-shaped embodiment of the flow splitter 302 described above, the flow splitter 402 defines a diverging U-shaped profile. For example, as particularly shown in FIG. 13, the flow splitter includes a forward wall 460 positioned along its upstream side 454 and first and second diverging sidewalls 462, 464 extending from the forward wall 460 towards the downstream side 456 of the flow splitter 402. In such an embodiment, the sidewalls 462, 464 may diverge away from each other such that a lateral width 466 (FIGS. 12 and 13) of the splitter 402 increases as the sidewalls 462, 464 extend between the upstream and downstream sides 454, 456 of the splitter 402. Moreover, in one embodiment, the sidewalls 462, 464 may diverge away from each other at differing rates along the vertical length of the splitter 402 such that the lateral width 466 of the splitter 402 along its downstream side 456 differs between the upper and lower ends 450, 452 of the splitter 402. However, as shown in FIG. 12, unlike the embodiment described above, the downstream lateral width 466 of the splitter 402 is greatest at the bottom end 452 of the splitter 402 and tapers or reduces as the splitter 402 extends lengthwise from its lower end 452 to its upper end 454.

Additionally, the sidewalls 462, 464 of the flow splitter 402 shown in FIGS. 11-13 define a varying or tapered depth 468 (FIG. 11) along the vertical length of the flow splitter 402. However, unlike the embodiment described above with reference to FIGS. 8-10, the depth 468 of each sidewall 462, 464 tapers as it extends lengthwise from the lower end 452 of the splitter 402 to the upper end 450 of the splitter 402. As a result, the depth 468 of each sidewall 462, 464 is greater at the lower end 452 of the splitter 402 than at the upper end 450 of the splitter 402.

Furthermore, unlike the various embodiments described above, the sidewalls 462, 464 of the splitter 402 correspond to arcuate or curved walls. Specifically, as shown in FIGS. 12 and 13, each sidewall 462, 464 defines a curved or arced profile as it extends between both the upstream and downstream sides 454, 456 of the splitter 402 (e.g., as shown in FIG. 13) and the upper and lower ends 450, 452 of the splitter 402 (e.g., as shown in FIG. 12). In one embodiment, such arcuate or curved sidewalls 462, 464 may assist in flipping or inverting the processed crop material flowing along each sidewall 462, 464. For instance, the curved sidewalls 462, 464 may be adapted to introduce a spinning or rotational component to the flow of crop material along each sidewall 462, 464. Such flipping or inversion of the processed crop material can facilitate enhanced separation of the debris from the billets as the crop material flows past the flow splitter 402 and into the downstream extraction chamber 93 (FIG. 2) of the extractor 54.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A system for removing debris from an agricultural harvester, the system comprising:
 a chopper assembly configured to receive and process crop material, the chopper assembly including an outlet through which a stream of processed crop material is discharged from the chopper assembly, the outlet extending in a lateral direction between a first lateral side and a second lateral side of the outlet and in a vertical direction between a top end and a bottom end of the outlet;
 a lower plate extending outwardly from the chopper assembly adjacent the bottom end of the outlet;
 an upper plate extending outwardly from the chopper assembly adjacent to the top end of the outlet; and
 a flow splitter supported relative to the outlet of the chopper assembly such that the flow splitter at least partially extends within the stream of processed crop material discharged from the chopper assembly, the flow splitter being configured to divide the stream of processed crop material into separate crop material flows for receipt within an extraction chamber of the agricultural harvester,
 wherein:
 the flow splitter is supported relative to the outlet so as to be aligned in the lateral direction with a portion of the outlet defined between the first and second lateral sides; and
 the flow splitter extends longitudinally between an upper end of the flow splitter and a lower end of the flow splitter, the flow splitter extending directly between the upper and lower plates such that the upper end of the flow splitter is positioned adjacent the upper plate and the lower end of the flow splitter is positioned adjacent the lower plate.

2. The system of claim 1, wherein the flow splitter is supported relative to the outlet so as to be aligned in the lateral direction with a central portion of the outlet defined between the first and second lateral sides.

3. The system of claim 1, wherein the lower plate comprises a support plate configured to support the flow splitter relative to the outlet of the chopper assembly and the upper plate comprises a deflector plate configured to define an upper vertical flow boundary for the stream of processed crop material discharged from the outlet of the chopper assembly.

4. The system of claim 1, wherein the flow splitter defines an upstream side and a downstream side relative to a flow direction of the stream of processed crop material, the flow splitter including first and second sidewalls extending between the upstream and downstream sides of the flow splitter.

5. The system of claim 4, wherein the first and second sidewalls diverge away from each other as the first and second sidewalls extend from the upstream side of the flow splitter such that a lateral width of the flow splitter increases from upstream side to the downstream side of the flow splitter.

6. The system of claim 5, wherein the upstream side of the flow splitter is defined by a leading edge of the flow splitter, the first and second sidewalls diverging from the leading edge as the first and second sidewalls extend towards the downstream side of the flow splitter.

7. The system of claim 5, wherein the first and second sidewalls extend longitudinally between the upper end of the flow splitter and the lower end of the flow splitter, the first and second sidewalls diverging away from each other such that the lateral width defined at the downstream side of the flow splitter tapers between the upper and lower ends of the flow splitter.

8. The system of claim 4, wherein the first and second sidewalls comprise planar walls or curved walls of the flow splitter.

9. The system of claim 4, wherein the upstream side of the flow splitter is defined by a forward wall of the flow splitter, the first and second sidewalls extending from the front wall towards the downstream side of the flow splitter.

10. An agricultural harvester, comprising:
a chopper assembly configured to receive and process crop material, the chopper assembly including a chopper housing and one or more chopper elements rotatably supported within the chopper housing, the one or more chopper elements being configured to chop the crop material to generate a stream of processed crop material including chopped billets and debris, the chopper housing defining an outlet immediately downstream of the one or more chopper elements through which the stream of processed crop material is discharged from the chopper assembly;
an extractor positioned downstream of the chopper assembly, the extractor including a housing defining an extraction chamber, the extraction chamber configured to receive the stream of processed crop material discharged from the chopper assembly;
a lower plate extending outwardly from the chopper assembly adjacent a bottom end of the outlet and an upper plate extending outwardly from the chopper assembly adjacent to a top end of the outlet; and
a flow splitter positioned at or adjacent to the outlet defined by the chopper housing and at least partially extending within the stream of processed crop material flowing between the chopper assembly and the extraction chamber, the flow splitter being configured to divide the stream of processed crop material into separate crop material flows,
wherein the chopped billets included within the separate crop material flows fall downwardly through the extraction chamber while the debris included within the separate crop material flows is directed upwardly through the extraction chamber,
wherein the flow splitter extends longitudinally between an upper end of the flow splitter and a lower end of the flow splitter, the flow splitter extending directly between the upper and lower plate such that the upper end of the flow splitter is positioned adjacent the upper plate and the lower end of the flow splitter is positioned adjacent the lower plate.

11. The agricultural harvester of claim 10, wherein the flow splitter defines an upstream side and a downstream side relative to a flow direction of the stream of processed crop material, the flow splitter including first and second sidewalls diverging away from each other between the upstream and downstream sides of the flow splitter such that the flow splitter defines a V-shaped profile.

12. A system for removing debris from an agricultural harvester, the system comprising:
a chopper assembly configured to receive and process crop material, the chopper assembly including an outlet through which a stream of processed crop material is discharged from the chopper assembly, the outlet extending in a lateral direction between a first lateral side and a second lateral side of the outlet and in a vertical direction between a top end and a bottom end of the outlet;
a lower plate extending outwardly from the chopper assembly adjacent the bottom end of the outlet;
an upper plate extending outwardly from the chopper assembly adjacent to the top end of the outlet; and
a flow splitter supported relative to the outlet of the chopper assembly such that the flow splitter at least partially extends within the stream of processed crop material discharged from the chopper assembly, the flow splitter being configured to divide the stream of processed crop material into separate crop material flows for receipt within an extraction chamber of the agricultural harvester,
wherein:
the flow splitter is supported relative to the outlet so as to be aligned in the lateral direction with a portion of the outlet defined between the first and second lateral sides; and
wherein the flow splitter extends longitudinally between an upper end of the flow splitter and a lower end of the flow splitter, the lower end of the flow splitter being coupled to the lower plate such that the flow splitter is supported relative to the outlet in a cantilevered arrangement.

13. The system of claim 12, wherein the flow splitter is supported relative to the outlet so as to be aligned in the lateral direction with a central portion of the outlet defined between the first and second lateral sides.

14. The system of claim 12, wherein the flow splitter is oriented relative to the upper plate such that the upper end of the flow splitter is positioned downstream of a downstream end of the upper plate, a flow gap being defined between the upper end of the flow splitter and the downstream end of the upper plate.

15. The system of claim 12, wherein the lower plate comprises a support plate configured to support the flow splitter relative to the outlet of the chopper assembly and the upper plate comprises a deflector plate configured to define an upper vertical flow boundary for the stream of processed crop material discharged from the outlet of the chopper assembly.

16. The system of claim 12, wherein the flow splitter defines an upstream side and a downstream side relative to a flow direction of the stream of processed crop material, the flow splitter including first and second sidewalls extending between the upstream and downstream sides of the flow splitter.

17. The system of claim 16, wherein the first and second sidewalls diverge away from each other as the first and second sidewalls extend from the upstream side of the flow splitter such that a lateral width of the flow splitter increases from upstream side to the downstream side of the flow splitter.

\* \* \* \* \*